(12) United States Patent
Menaldo et al.

(10) Patent No.: US 7,143,663 B2
(45) Date of Patent: Dec. 5, 2006

(54) STEERING WHEEL WITH THERMOPLASTIC COMPOSITES

(75) Inventors: Lorenzo Menaldo, Villafranca (IT); Giuseppe Testa, Illasi (IT)

(73) Assignee: Key Safety Systems, Inc., Sterling Heights, MI (US)

( * ) Notice: Subject to any disclaimer, the term of this patent is extended or adjusted under 35 U.S.C. 154(b) by 472 days.

(21) Appl. No.: 10/633,604

(22) Filed: Aug. 4, 2003

(65) Prior Publication Data

US 2004/0149074 A1 Aug. 5, 2004

(30) Foreign Application Priority Data

Jan. 30, 2003 (EP) .................................. 03425050

(51) Int. Cl.
*B62D 1/04* (2006.01)
*B21D 53/26* (2006.01)
*B27N 3/10* (2006.01)

(52) U.S. Cl. ..................... 74/552; 74/558; 29/894.1; 264/257

(58) Field of Classification Search ............. 74/552, 74/558; 156/96, 267; 29/894.1; 264/449, 264/257; B62D 1/06
See application file for complete search history.

(56) References Cited

U.S. PATENT DOCUMENTS 4,948,840 A 8/1990 Berta

| | | | |
|---|---|---|---|
| 5,840,144 A * | 11/1998 | Schumacher et al. | 156/267 |
| 6,249,970 B1 * | 6/2001 | Cattaneo | 29/894.1 |
| 6,282,982 B1 | 9/2001 | Testa | |
| 6,360,632 B1 * | 3/2002 | Papandreou | 74/558 |
| 6,365,875 B1 | 4/2002 | Kreuzer et al. | |
| 6,524,515 B1 * | 2/2003 | Cavalli | 264/449 |
| 6,668,683 B1 * | 12/2003 | Fleckenstein | 74/552 |
| 6,797,087 B1 * | 9/2004 | Hosokawa et al. | 156/73.1 |

FOREIGN PATENT DOCUMENTS

| | | | |
|---|---|---|---|
| EP | 0 542 253 A2 | 5/1993 | |
| EP | 0 261 786 | 3/1998 | |
| EP | 1 029 881 A1 | 8/2000 | |
| GB | 2 333 741 A | 8/1999 | |
| JP | 3-271068 | * 12/1991 | 156/196 |
| WO | WO-96/22327 | 7/1996 | |
| WO | WO-99/13004 | 3/1999 | |
| WO | WO-99/20681 | 4/1999 | |

* cited by examiner

*Primary Examiner*—Vinh T. Luong
(74) *Attorney, Agent, or Firm*—Lonnie Drayer

(57) ABSTRACT

A steering wheel or other component for motor vehicle interiors, is produced by pressure thermoforming an external layer of decorative material, together with an internal structural layer of support material that includes a matrix of thermoplastic material and a plurality of reinforcing fibers for the thermoplastic matrix. The matrix may be of polymer that impregnates the fabric or made of fabrics that are interwoven or mixed with the reinforcing fibers.

14 Claims, 2 Drawing Sheets

STEERING WHEEL WITH THERMOPLASTIC COMPOSITES

FIELD OF THE INVENTION

The present invention relates to a steering wheel and to a process for making a steering wheel.

BACKGROUND OF THE INVENTION

Steering wheels for vehicles comprise a base structure including a circular part, or rim, that is connected to a hub by spokes. This base structure is either made of solid material or it may comprise a core or frame of metal or other suitable material (plastic, carbon fiber and the like) covered by an expanded material. The "skin" of the steering wheel, in particular of the circular rim, may be integral with the material of the base structure or include a decorative cover, or veneer, of valuable material, for example, briar or other valuable wood. This solution is particularly expensive and is used in luxury car models.

U.S. Pat. No. 6,282,982 teaches a production process for steering wheels wherein two half shells including several layers of wood and thermosetting materials are thermoformed and then assembled and bound around the base structure. The steering wheel thus assembled is treated in a known way, for example, with lacquer or enamel, to obtain the final product.

This process and the similar, known processes in the art have the drawbacks of being time-consuming and of requiring a relatively high amount of material for the production of the assembled steering wheel. In particular, it takes approximately four minutes to produce the half shells by hot mold thermosetting and the assembly and gluing times of the half shells onto the base structure is approximately five to ten minutes.

A further problem of the known art is that the mold used has to be kept at high temperatures in order to effect the cross-linking of the thermosetting polymers. Another problem with the previous art is that fabrics cannot be used as an external covering or veneer.

SUMMARY OF THE INVENTION

The present invention solves the problems mentioned above and provides a production process for steering wheels having a veneer layer that takes less time and is cheaper than the known and currently used method, whilst maintaining very high product quality.

There is provided in accordance with one aspect of the present invention a steering wheel or other component for motor vehicle interiors comprising a base structure and an outer cover on said structure, wherein said outer cover comprises at least one internal structural layer of a thermoplastic material containing reinforcing fibers.

According to a another aspect of the invention, the amount of said fibers in the internal structural layer is within the range of about 10 to about 80% by weight and preferably within the range of about 20 and about 60% by weight.

According to a further aspect of the invention, the thermoplastic material is in the form of fibers, for example woven with reinforcement fibers.

According to another preferred aspect of the invention, said thermoplastic material is chosen from polyolefin and polypropylene homo and copolymers and homo and copolymers of polyolefins and polypropylene grafted with compounds bearing functional groups; vinyl polymers such as polystyrene, polyesters such as PET and PBT, acrylic and methacrylic polymers, such as polymethylmethacrylate (PMMA), aromatic polyesters, polyamides and mixtures thereof. Polyolefin grafting methods are known for example from EP-A-261786, EP-A-542253 and WO96/22327.

There is provided in accordance with yet another aspect of the present invention a process of producing a steering wheel that has a base structure and an outer cover applied on said structure, comprising the steps of: (a) placing at least one internal structural layer and at least one decorative veneer layer into a mold, said at least one internal structural layer including a thermoplastic material and reinforcing fibers of said material; (b) heating said mold at a temperature sufficient to shape said layer of reinforced thermoplastic material; and (c) bonding and shaping said structural and decorative layers by pressure thermoforming, also known as matched mold forming, to provide a composite material outer cover.

BRIEF DESCRIPTION OF THE DRAWINGS

The invention is hereinafter disclosed in greater detail with reference to the accompanying drawings, which are enclosed for illustration only and without any limiting purpose.

DETAILED DESCRIPTION OF THE INVENTION

As used herein and in the claims the term "component for motor vehicle interiors" means, besides steering wheels, components such as the knob for the top of the gear stick shaft, door-handles and the like. The following disclosure will refer to steering wheels in particular, but should be considered to refer also to covering materials such as the ones mentioned above.

Figure 1:
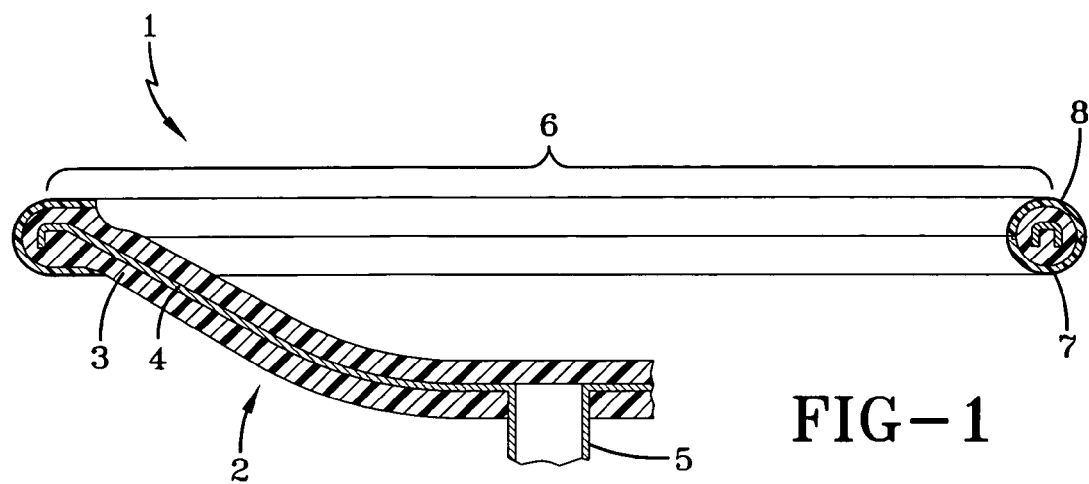
FIG. 1 is a schematic and partial view of a section of a steering wheel.

With reference to FIG. 1, the steering wheel shown includes, as in the previous art, a base structure 2 that, in the shown embodiment, comprises an insert or core frame 4, e.g. in metal, extending from a hub 5 to a circular rim portion 6. In correspondence to the circular rim portion 6 and the spokes that connect the hub to portion 6, an insert 4 is surrounded by a plastic material 3, generally of a kind that can be injection-molded and optionally a foamed material.

The steering wheel 1 also includes at least one external cover element formed by two half shells 7, 8. The half shells are formed by an internal structural layer 9, and a veneer layer 10, that has an aesthetic function and is supported by the internal structural layer 9. According to the invention, the internal structural layer 9 should preferably be one, or made up of two layers that are bonded together at the thermoforming step. The internal structural layer 9 comprises one or more thermoplastic materials containing reinforcing fibers. The thermoplastic materials function as a matrix in which the reinforcing fibers are distributed; the reinforcing fibers are kept together by the thermoplastic material. The fibers used are at least 12.5 mm long and are preferably in the form of a "mat" or in the form of a woven fabric or non-woven fabric, which is usually impregnated with the thermoplastic material.

The amount of said fibers in the internal structural layer 9 is within the range of about 10 to about 80%, and preferably about 20 to about 60% by weight of the final weight of the internal structural layer 9, i.e., of the weight of the internal structural layer 9 present in the half shell. If the internal structural layer 9 is made of a combination of several layers of permeated mats, weight percentages of fibers can be different from layer to layer as long as the final percentage is within the above mentioned ranges.

The weight per square meter of the internal structural layer 9, which, in its finished form, is within the range of 500 to 3000 g/m$^2$ and preferably within the range of 1100 to 2500 g/m$^2$.

Fibers that are suitable for use in the practice of the present invention are, for example, fiber glass, carbon fiber, aluminum fiber, natural fibers such as cotton, sisal, jute, linen, hemp and similar; resin and plastic material fibers such as polyester, polyolefins, polyamides and polyaramides and a mix thereof, as long as they have a melting temperature higher than the melting temperature of the thermoplastic material, which constitutes the matrix of the support material. The melting temperature of the resin support fibers is also higher than the molding temperature. In particular, the reinforcement fibers are such that they substantially preserve their mechanical characteristics after the pressure-molding (thermoforming) step.

Homopolymers and copolymers of polyethylene and polypropylene, polyolefin in general, polymethylmethacrylates and polyethylene terephthalates are suitable materials for the thermoplastic matrix.

In one embodiment, the structural material, comprising reinforcing fibers and thermoplastic matrix is formed by reinforcing fibers that are impregnated with the thermoplastic material that acts as a binding matrix. In a different embodiment the thermoplastic material, in particular if it is PET, PP or other polyolefins, is also in a fiber form, as a woven or non-woven fabric. In this case, the thermoplastic material fibers are preferably co-woven, i.e., physically mixed, with the reinforcement fibers. When the structural material is heated and thermoformed, the thermoplastic fibers melt within and around the reinforcing fibers to form with said fibers a supporting shell for the veneer layer.

The suitable materials for creating the internal structural layer 9 are, for example, those used for the production of motorcycle crash helmets.

Preferably, the polyolefinic polymer used for the thermoplastic matrix is functionalized, i.e., it has functional groups inserted on the polymer chain through grafting of units containing said functional groups. Examples of suitable techniques and polymers are taught in EP-A-261786, EP-A-542253, WO96/22327, WO99/20681, U.S. Pat. No. 4,948, 840 and EP-A-1185582. These techniques require a reaction between polyolefins and polymers containing double bonds and functional groups, in the presence of radical initiators, e.g. peroxides.

The veneer layer 10, which has a decorative purpose, is selected e.g. from valuable woods such as briar. Other materials can be used, such as metals, e.g. aluminum, fabrics from carbon fibers or other special fibers, and fabrics from textile fibers such as nylon, polyester, acrylics and natural textile fibers.

Figure 3:
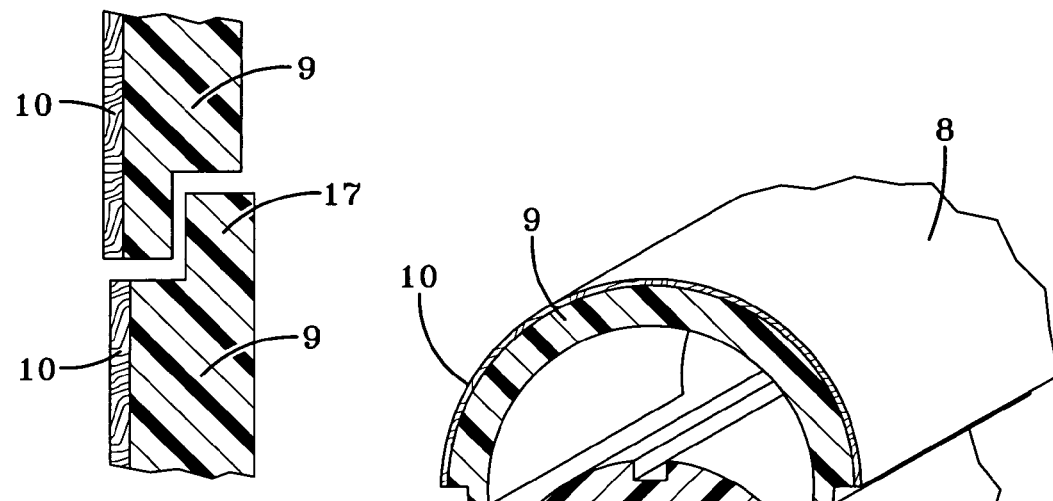
FIGS. 3 and 4 are schematic and sectional views of the junction of the half shells of the invention.
Figure 2:
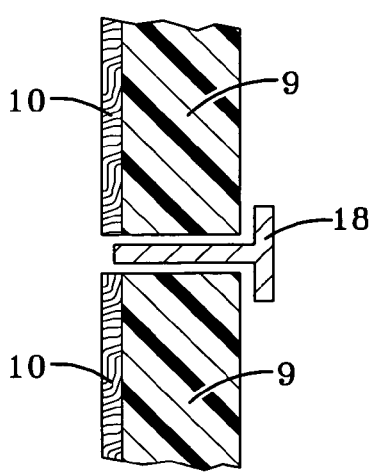
FIG. 2 is an exploded and enlarged schematic view of the section of the steering wheel on the right side of FIG. 2.

The edges of the half shells for the steering wheel can be provided with "steps" or coupling teeth, as shown in FIG. 3, to improve their bonding in the following bonding step around the base structure 2, as best shown in FIG. 2. One or more grooves 11 are cut into the surface of the polymeric portion 3 of structure 2 in order to allow for its possible variations in volume. The mold may be cooled after the coupling and shaping step to speed up the production process.

Figure 5:
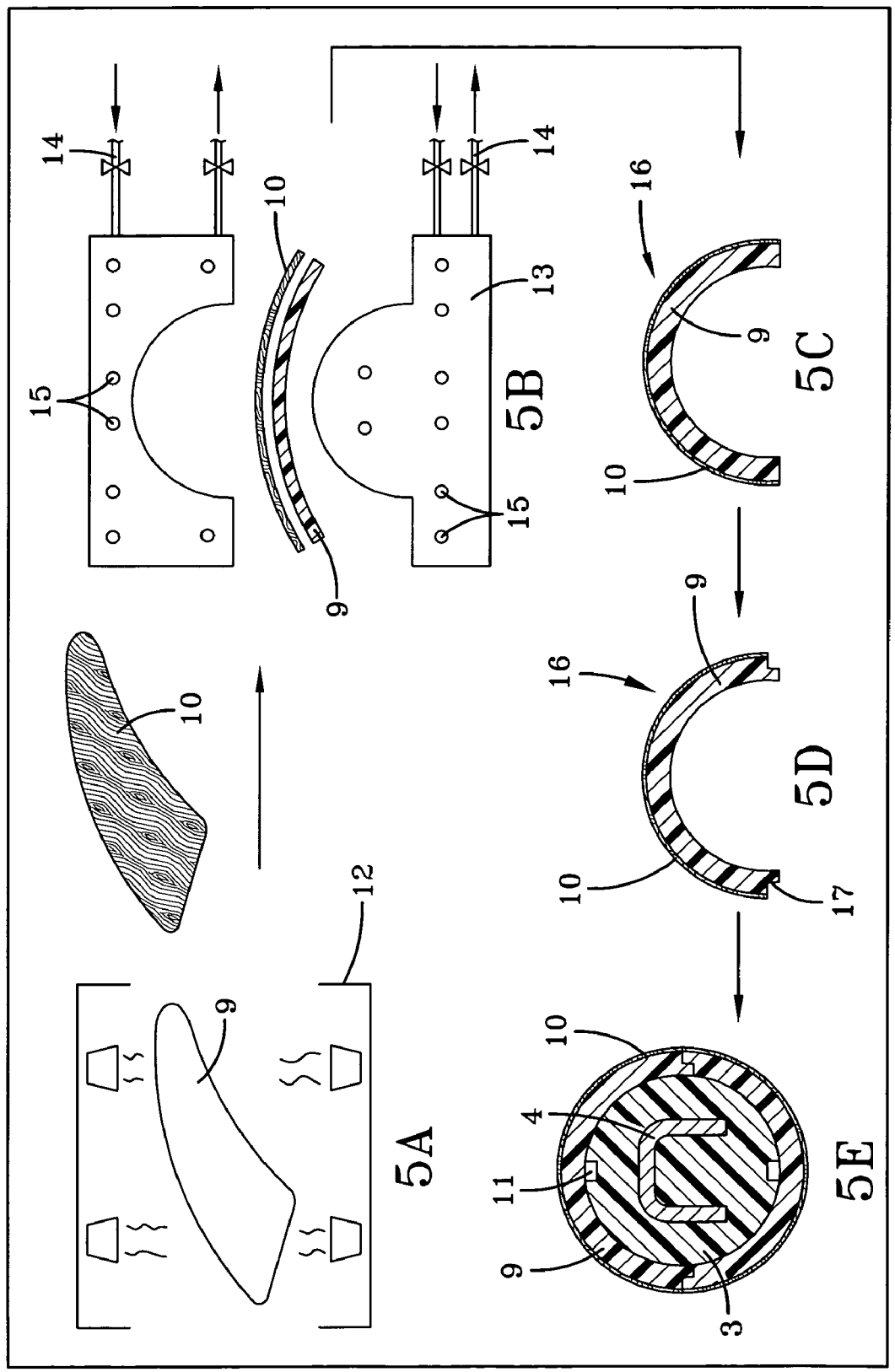
FIG. 5 schematically shows production steps 5A–5E of a covering element for steering wheels according to the present invention.

The invention also covers the production of components for motor vehicle interiors other than steering wheels and in particular it covers a process for the production of components for motor vehicle interiors of the above-mentioned type. FIG. 5 schematically shows some of the production steps for a steering wheel according to the present invention.

Initially, the internal structural layer 9 containing fibers and thermoplastic materials is heated in an oven 12 until the internal structural layer 9 reaches a plastic state, as shown in 5A. Then the internal structural layer 9 thus heated and a veneer layer 10, i.e., the layer that will be visible once applied to the steering wheel, are positioned in a mold 13, as shown in FIG. 5B. The mold 13 includes fluid feeding means 14 and circulation means 15 that circulate fluid at a controlled temperature so as to carry out a quick variation of the mold temperature during the production process. When the internal and veneer layers 9, 10 are positioned in mold 13, the mold is preferably already heated to a temperature equal to or slightly higher than the temperature required for melting the polymer, i.e., the thermoplastic material, which serves as a impregnation matrix for the fibers. This temperature should preferably be within the range of Tf and Tf+20° C., Tf being the melting temperature of said thermoplastic material. In the event that the reinforcing fibers and/or the veneer fabric fibers are thermoplastic materials, their melting temperature will be higher than the temperature of the mold, i.e., higher than the maximum temperature (Tf+20° C.) of the mold. In other words, the mold is kept a temperature that is equal or higher than the melting temperature for the thermoplastic material which acts as a matrix for the reinforcing fibers, and at a lower temperature than that required for melting the reinforcement fibers or the veneer fibers.

The two or more layers being treated are positioned inside a mold cavity that is substantially the same size as the desired final piece. When the mold is closed the two, or more, layers are compressed, shaped and bonded together. The melted thermoplastic material of the internal structural layer 9 penetrates the pores of veneer layer 10, and binds the two layers together. The use of specifically prepared polymers functionalized for the internal structural layer 9 improves the bond between the internal and veneer layers.

Figure 4:
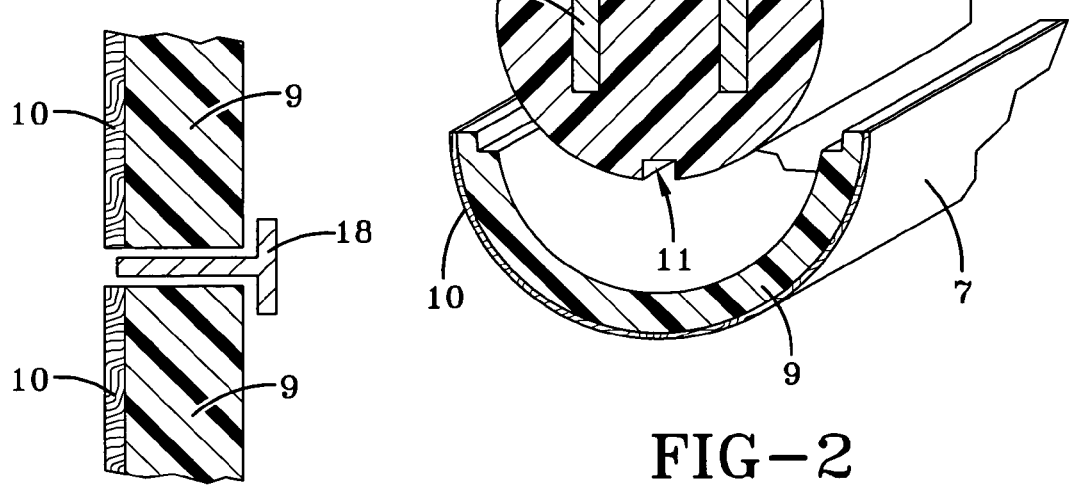

The piece that comes out of the mold, i.e. the half shell 16 is shown in FIG. 5C. The edges of this piece are then treated, as shown in FIG. 5D, in a known way to obtain a configuration of the edges that is suitable for the following joining step of the two semi-shells, as shown in FIG. 5E. Examples of suitable configurations are shown in FIGS. 3 and 4. A configuration with steps 17 is shown in FIG. 3, while a flat configuration of the edge of the semi-shell is shown in FIG. 4. The edges can be glued together or, preferably, welded. In the embodiment schematically shown in FIG. 4, an element 18 is provided to improve the bond between the parts.

The invention will now be further illustrated with reference to the following example.

A layer of fabric with thermoplastic material matrix, having a thickness of about 1.2 mm, possibly reinforced with fiber glass, is heated to a temperature within the range of about 150° C. to about 300° C. for a period within the range of about 20 to about 60 seconds and is then placed in a heated mold at a temperature within the range of about 50° C. and about 300° C. with a veneer of briar wood having a thickness of about 8 mm. The two layers are pressure-molded (thermoformed) for a period within the range of about 50 to about 240 seconds and are then taken out of the mold. The half-shells thus obtained are about 1.8 mm thick and offer high precision in reproducing the shapes and dimensions of the design. These pieces are then milled in order to provide them with the joining steps at their edges.

Once the milling has been completed the shells are bound together by gluing or welding around and over the prepared steering wheel. The whole piece (steering wheel and shells) is then painted to impart the final look.

The present invention provides several advantages over the known art. First the process time for the production of the covering element or half shell is reduced by at least 30% of the old time. In particular, in the production of covering elements for steering wheels, the time required for the molding (thermoforming) step is reduced from about 4 minutes to about 0.5 to about 1.0 minutes.

Moreover, there is no polymer cross-linking, because the polymer is a thermoplastic polymer rather than a thermosetting one. This fact and the substantial absence of resin leakage from the layers during the molding results in a cleaner process compared to the known ones, making it unnecessary to clean the mold after every molding run.

A further advantage is that less material needs to be used for the half shell. One layer is in fact sufficient, or at most two layers of structural material, as opposed to the five layers previously required and two layers of wood are also no longer required, as it was in the known art that uses thermosetting materials.

Another advantage is the possibility of using new materials such as carbon fibers, kevlar, aluminum, sheet metals and fabrics for the veneer layer.

Yet another advantage is that of being able to bind the two half shells by welding as well as by gluing and, if required, by plastering and painting the half shells to eliminate any imperfections.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

We claim:

1. A steering wheel comprising:
   (a) a base structure; and
   (b) at least one covering element formed as a subassembly and then applied onto said base structure, wherein said covering element comprises
      (i) at least one internal structural layer comprising a thermoplastic material containing reinforcing fibers, the reinforcing fibers comprising 10 to 80% by weight of the internal structural layer and wherein the fibers are at least 12.0 mm long and in the form of a mat or in a woven or non-woven fabric impregnated with the thermoplastic material, and
      (ii) at least one external decorative layer located on and bonded to a side of the internal structural layer distal from said base structure wherein melted thermoplastic material of the internal structural layer penetrates pores of the external decorative layer to bind the two layers together in the absence of thermoset resin adhesives.

2. The steering wheel according to claim 1, wherein said fibers are in the form of a woven fabric, the reinforcing fibers are at least 12.0 mm long.

3. The steering wheel according to claim 2, wherein the amount of said reinforcing fibers in the internal structural layer is within the range of 20 to 60% by weight of the internal structural layer.

4. The steering wheel according to claim 1, wherein said fibers are in the form of a non woven fabric, the reinforcing fibers are at least 12.0 mm long.

5. The steering wheel according to claim 4, wherein the amount of said reinforcing fibers in the internal structural layer is within the range of 20 to 60% by weight of the internal structural layer.

6. The steering wheel according to claim 1, wherein the weight of the internal structural layer is within the range of 500 to 3000 g/m$^2$.

7. The steering wheel according to claim 1, wherein the thermoplastic material of the internal structural layer is selected from the group consisting of: polyesters, polyacrylates, and polymethacrylates, homo and copolymers of polypropylene and polyolefines, homo and copolymers of polypropylene and polyolefins grafted with compounds having functional groups, and mixtures thereof.

8. The steering wheel according to claim 7, wherein the fibers located in the thermoplastic material of the internal structural layer are selected from the group consisting of: fiber glass, carbon fiber, aluminum fiber, natural fibers such as cotton, sisal, jute, linen, hemp and similar; resin and plastic material fibers such as polyester, polyolefins, polyamides and polyaramides and a mix thereof, as long as the fibers have a melting temperature higher than the melting temperature of the thermoplastic material.

9. The steering wheel according to claim 8, wherein the at least one external layer located on a side of the internal structural layer distal from said base structure comprises wood.

10. The steering wheel according to claim 7, wherein the at least one external layer located on a side of the internal structural layer distal from said base structure comprises wood.

11. The steering wheel according to claim 1, wherein the fibers located in the thermoplastic material of the internal structural layer are selected from the group consisting of: fiber glass, carbon fiber, aluminum fiber, natural fibers such as cotton, sisal, jute, linen, hemp and similar; resin and plastic material fibers such as polyester, polyolefins, polyamides and polyaramides and a mix thereof, as long as the fibers have a melting temperature higher than the melting temperature of the thermoplastic material.

12. The steering wheel according to claim 11, wherein the at least one external layer located on a side of the internal structural layer distal from said base structure comprises wood.

13. The steering wheel according to claim 1, wherein the at least one external layer located on a side of the internal structural layer distal from said base structure comprises wood.

14. A component for a motor vehicle interior comprising:
   (a) a base structure; and
   (b) at least one covering element formed as a subassembly and then applied onto said base structure, wherein said covering element comprises
      (i) at least one internal structural layer comprising a thermoplastic material containing reinforcing fibers, the reinforcing fibers comprising 10 to 80% by weight of the internal structural layer and wherein the fibers are at least 12.0 mm long and in the form of a mat or in a woven or non-woven fabric impregnated with the thermoplastic, and (ii) at least one external decorative layer located on and bonded to a side of the internal structural layer distal from said base structure wherein melted thermoplastic material of the internal structural layer penetrates pores of the external decorative layer to bind the two layers together in the absence of thermoset resin adhesives.

* * * * *